United States Patent [19]

Borsari

[11] Patent Number: 5,030,819

[45] Date of Patent: Jul. 9, 1991

[54] METHOD AND DEVICE FOR NUMERICAL CONTROL FOR ELECTROEROSION MACHINE

[76] Inventor: Claudio Borsari, Ch- 6652, Tegna, Switzerland

[21] Appl. No.: 329,527

[22] Filed: Mar. 28, 1989

[30] Foreign Application Priority Data

Mar. 29, 1988 [DE] Fed. Rep. of Germany ....... 3810662

[51] Int. Cl.$^5$ ............................................. B23H 7/06
[52] U.S. Cl. ............................. 219/69.12; 219/69.17; 364/474.04; 364/474.31
[58] Field of Search ...................... 364/474.04, 474.31; 219/69.17, 69.12

[56] References Cited

U.S. PATENT DOCUMENTS

| | | | |
|---|---|---|---|
| 4,550,383 | 10/1985 | Sugimoto | 364/474.31 |
| 4,648,024 | 3/1987 | Kato et al. | 364/474.31 |
| 4,663,726 | 5/1987 | Chaud et al. | 364/474.31 |
| 4,700,314 | 10/1987 | Kinoshita | 219/69.12 |
| 4,703,146 | 10/1987 | Kinoshita | 364/474.04 |
| 4,713,517 | 12/1987 | Kinoshita | 219/69.12 |
| 4,843,203 | 6/1989 | Gamo et al. | 219/69.12 |

FOREIGN PATENT DOCUMENTS

| | | |
|---|---|---|
| 62074 | 4/1982 | European Pat. Off. . |
| 124611 | 5/1984 | European Pat. Off. . |
| 2052161 | 1/1972 | Fed. Rep. of Germany . |
| 114822 | 7/1983 | Japan .............................. 219/69.17 |

OTHER PUBLICATIONS

"Konish-Schneiden auf Draht-Erodieranlagen" by B. Schumacher, pp. 44-46, *tz fur Metallarbeitung*, vol. 174, No. 21/80.

*Primary Examiner*—Geoffrey S. Evans

[57] ABSTRACT

A process and a device for numeric path control for electroerosion machines having a wire electrode stretched between two guides and a guide connected to a work piece are proposed. To lessen cutting errors on work pieces to be processed, and thus to decrease the amount of geometric information that must be fed into a numeric control of a wire electrode erosion machine, it is proposed that only a few figures for track points be supplied and intermediate track points be determined by interpolation. The interpolation for the intermediate track points of the two movable guides is carried out according to various types. For example, one interpolation is linear, while the other interpolation is performed according to a circular function.

18 Claims, 4 Drawing Sheets

METHOD AND DEVICE FOR NUMERICAL CONTROL FOR ELECTROEROSION MACHINE

BACKGROUND OF THE INVENTION

The invention concerns a method and a device for numeric path control for electroerosion machines.

The processing of work pieces to achieve relatively difficult geometric figures, as for example a hyperboloid shape, must be done with the maximum possible precision of the existing surfaces as against the desired surfaces (actual surface, target surface). The surface precision of the work piece processed is in this instance defined by the course of an actual track curve on the surface in relation to a target track curve.

From European patent specification 0 062 074, it is known how to use an erosion wire the two guides of which are moved independently of each other. So that one does not have to feed in too many track points for the definition of the track curves for the guides, and thus indirectly for the target track curves, on the surface of the work piece, it is known how to determine the complete, desired track curve between given track points, with the help of a given function, by means of interpolation. According to the known art, the interpolation of the track curves is performed for the two guides of the wire electrode independent of each other; however, in both cases the nature or the interpolation, or, more precisely, the mathematical function, according to which the interpolation is made, is identical.

However, the measurement precision, and in particular the surface quality, of work pieces processed with the known machine, were found to be unsatisfactory.

SUMMARY OF THE INVENTION

It is therefore the task of the invention to decrease cutting errors on the work piece being processed, with supplying of less geometric information to the erosion device.

According to the method, this task is executed by the characteristics indicated in the characteristics portion of patent claim 1, as regards the method, and in the characteristics portion of patent claim 9, as regards the device.

Through the various interpolations for the moved guides, one can better adjust the track curves actually travelled to the desired track curves, without being obliged to supply too many figures for discrete track points.

The track curve travels through a number of intermediate points computed by interpolation, which constitute a measure for precision, insofar as the actual track curve diverges from the target track curve.

A connection between the upper and the lower track curve is created at the relevant cutting points of the electrode wire in the work piece to be processed by "phase relation" of the simultaneous wire cutting points. This will be clarified by means of an example in which two guides are moved along an orbit, with both orbits being precisely perpendicular to each other for the sake of better ease of accessibility and having the same diameter. If at one point, then, the two wire cutting points are not perpendicular, if they are instead out of line with each other, this offset can be described by an angle or even a phase relation.

In a particularly advantageous embodiment of the invention, the movement of the erosion wire between any two corresponding points on the track of the upper and lower surfaces of the work piece begins and ends simultaneously.

An advantageous embodiment has on the one hand a circular interpolation and on the other hand an elliptical interpolation, and another embodiment has a linear interpolation and an elliptical interpolation.

In another embodiment, one interpolation is linear, the other circular.

Another embodiment has one hyperbolic and one linear interpolation of the movement.

In another embodiment of the invention, one movement is interpolated hyperbolically, the other in circular manner.

In yet another embodiment of the invention, the movement is interpolated hyperbolically on the one hand, elliptically on the other.

In another embodiment, one interpolation is circular, the other parabolic, and in another embodiment one interpolation is elliptical and the other is parabolic.

In another embodiment, one interpolation is linear and the other parabolic, and in another embodiment one interpolation is hyperbolic and the other parabolic.

In another embodiment, one interpolation is parabolic and the other interpolation is cubic. The cubic interpolation serves in particular to facilitate three-degree curves or "splines."

In another embodiment, one interpolation is circular and the other cubic, and in another embodiment one interpolation is elliptical and the other cubic.

In another embodiment, one interpolation is linear and the other cubic, and in another embodiment one interpolation is hyperbolic and the other is cubic.

In theory, any combination of the curve shapes is possible for the interpolation, insofar as the interpolation function of one guide is different from that of the other guide. When linear, circular, elliptical, parabolic, and other interpolations are mentioned, this means that the mathematical function according to which two adjacent existing track points are interpolated is a straight line, a circle, an ellipse, a parabola, etc , with additional parameters naturally existing for the non-linear interpolations. For example, in the circular interpolation (interpolation along a circular track), the center of the circle and the radius of the circle will be supplied; in the ellipse, the position of the two focal points is to be supplied; and so on.

If one or both guides have only two movement components (e.g., an X axis and a Y axis), the interpolation is done on only one plane (e.g., the X plane, the Y plane). In certain cases, one or both guides can also move on three axes, however, for example, with work pieces having differing thickness, in which the "width between jaws" changes during the eroding, in which one or both guides are also moved in the direction of the Z axis. In these cases the interpolation can also take the Z axis into consideration, so that the desired track curve in the three space axes changes. In these cases, the interpolation is then made along a track curve lying in the space.

Naturally, all other known interpolations can be used to create a specific curve shape.

Embodiments of the invention are illustrated in the drawings, and are described below in greater detail.

DETAILED DESCRIPTION OF THE PREFERRED EMBODIMENTS

Figure 1:
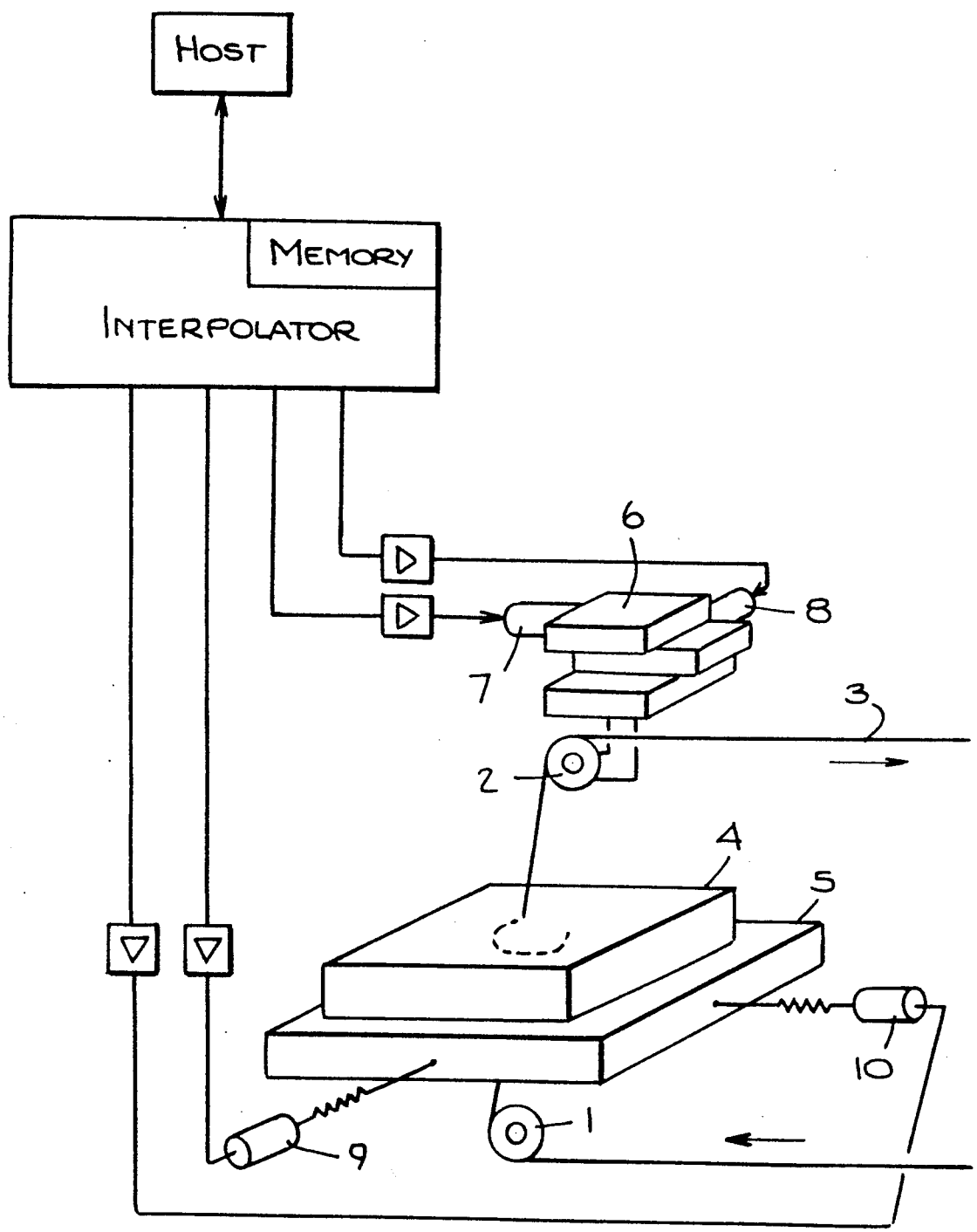
FIG. 1 shows a perspective view of an erosion machine with a mobile guide and a mobile work piece on a cross-table.

In the drawings, partly for clarification, the position of a Carthesian reference coordinates system (X, Y, Z) indicating the position of the main axes of the erosion machine is shown.

Since the construction of an electroerosion machine is generally known, it will not be discussed here in detail.

FIG. 1 shows a wire electrode 3 that is led by two wire guides 1, 2 through a work piece 4 that is to be processed, and which is positioned on a cross-table 5. Wire guide 2 is connected with a movement mechanism 6, which can be moved by two motors 7, 8, in U or V direction. Furthermore, cross-table 5 can be moved between the two motors 9 and 10 in X and Y direction. This device is particularly appropriate when major divergences of the wire electrode 3 between the two wire guides 1, 2 are necessary and at the same time the work piece 4 positioned on the cross-table 5 is not excessively difficult.

To cut desired geometric bodies, coordinate values of path points of the body are input into a memory of the numeric control, for example, by means of a perforated-tape scanner. These coordinate values refer to the planes of the workpiece surface which are intersected by the wire electrode for the purpose of cutting.

Naturally the idea is to supply as few "external" values as possible. For this reason, interpolators are used to compute the path curve between the given points as the best possible approximation to the desired path shape between the given points. Thus, between the given points the further movement of the wire electrode 3 along the path runs completely independent by itself according to a predetermined path curve.

The track curves determined by the mobile parts 2,5 are interpolated separately. For example, the movement of cross-table 5 controlled by motors 9 and 10 can lead to a track curve interpolated in linear manner, while in contrast motors 7, 8 effectuate a movement of wire guide 2 that creates a track curve which is interpolated in circular manner. A track course of this type is illustrated in greater detail in FIG. 3.

The alignment between the individual track curves is facilitated with the help of an interposed CNC computer.

Figure 2:
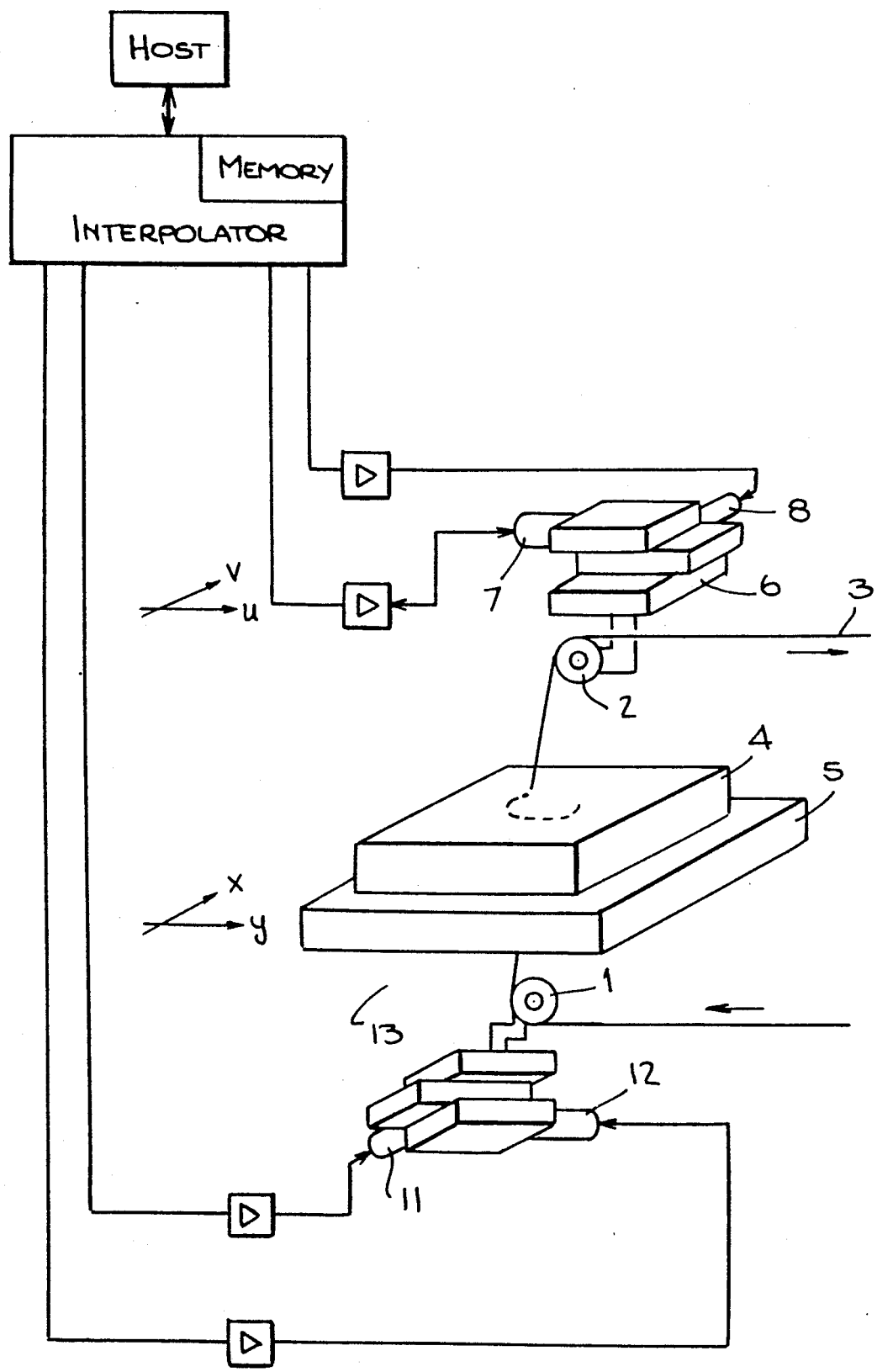
FIG. 2 shows a perspective view of an erosion machine with two mobile wire guides.

FIG. 2 shows in theory an erosion machine as in FIG. 1, in which, however, the movement of the bottom guide is effectuated no longer by the change of position of cross-table 5, but rather by the change of position of the lower wire guide 1, for which purpose motors 11 and 12 are supplied in connection with a movement mechanism 13.

Unlike the embodiment according to FIG. 1, the embodiment according to FIG. 2 is applied in the case of very difficult work pieces 4, in which the progressive movement is more complicated and costly than the movement of the relatively small and light wire guide 1.

Figure 3:
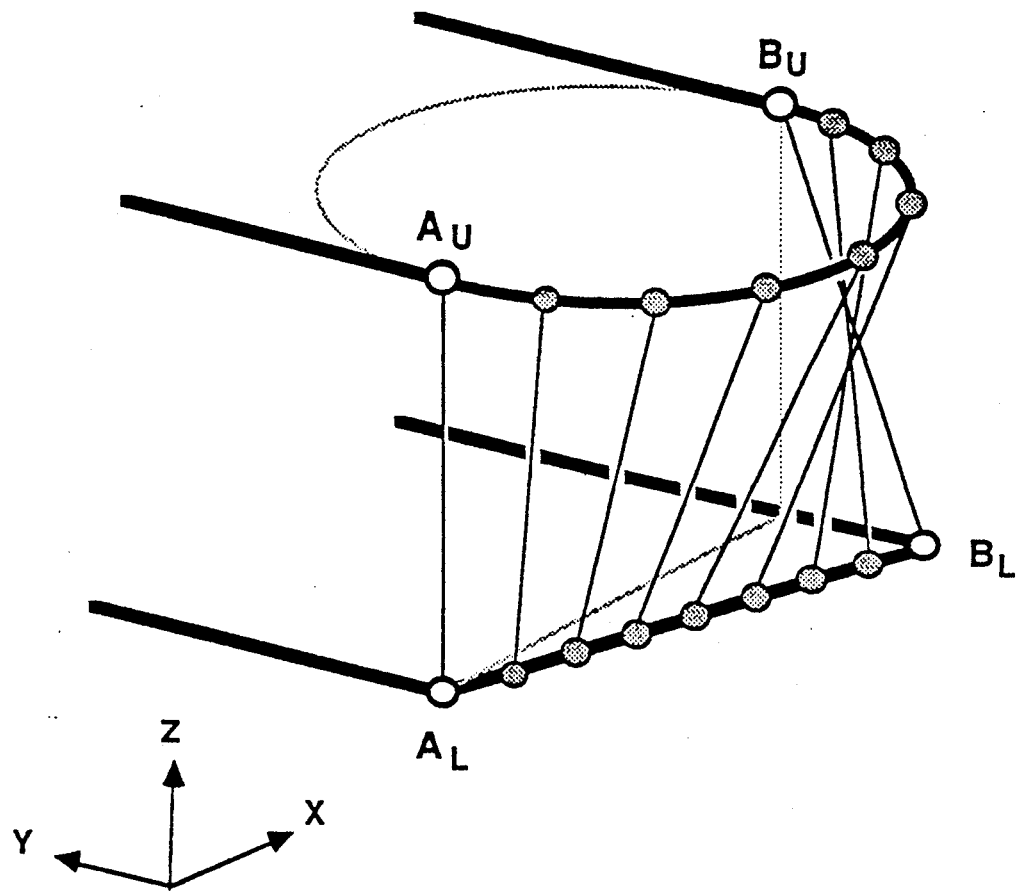
FIG. 3 shows the course of two track curves with differing interpolation (circular - linear)

FIGS. 3 shows the path curves of the wire electrode 3 between path points $A_U, B_U$ and points $A_L, B_L$. The particular points hatched in gray in the drawing represent the points through which the wire electrode passes. It can be inferred with the drawing that the interpolation between the points of the lower path curve is performed linearly from $A_L$ to $B_L$, while in contrast the interpolation between the points of the upper path curve is performed circularly from $A_U$ to $B_U$. In the case of the circular interpolation, only the starting and ending points and the radius of the circle along whose circumference the interpolation is to be made are to be supplied from outside; that is, the operating personnel are obliged to supply a minimum of figures in relation to the work precision to be achieved. The track points shown as hatchings in FIG. 3 are thus intermediate points computed by the interpolators, so that in this case only the values for points $A_L, B_U, A_L,$ and $B_L$ must be supplied. From this example it is evident that even very complicated geometrical figures can be defined with an extremely small number of externally supplied values, and that nevertheless these geometric figures can be obtained with the greatest precision. In an extreme case, the "step size" for the interpolation can be practically as small as desired, with the step size of the still-controllable movements that is supplied by the step size of the step motors used (with due consideration of possible operating step-downs) is chosen as the appropriate bottom limit.

As already explained above, by means of an interposed CNC computer the upper and lower movement of wire electrode 3, beginning with points $A_U$, $A_L$ and ending with points $B_U$, $B_L$, is performed in reciprocal phase relationship, in such manner that wire electrode 3 at one point runs simultaneously through $A_U$ and $A_L$, and at another point it runs simultaneously through $B_U$ and $B_L$.

Figure 4:
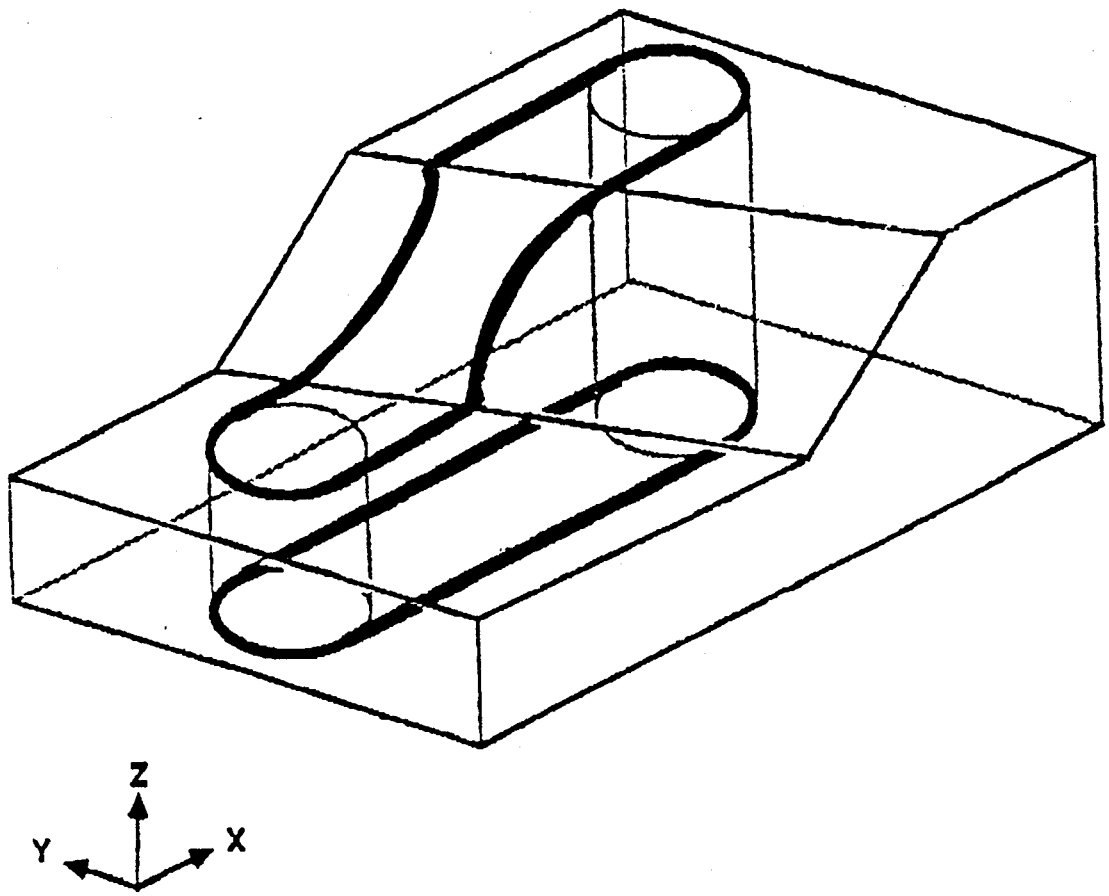
FIG. 4 shows the course of two track curves with differing interpolation, in which one track curve has in addition components in the direction of the Z axis.

Lastly, FIG. 4 shows the same movement possibility of wire electrode 3, in which, however, the movement of a track curve can also be Z-interpolated, so as to cope with the height of a work piece 4 to be processed.

Naturally, for the interpolation of the track curve between the characteristic points, all functions that can be appropriately illustrated are possible, and the designations linear, circular, elliptical, or hyperbolic interpolation are thus given only by way of examples.

What is claimed is:

1. In a method for numeric path control for a wire electrode electroerosion cutting machine including two wire guides and a workpiece located therebetween, wherein the two wire guides are moved independently of each other, the method comprising the steps of moving the workpiece and the wire electrode in respect of each other, and inputting path points of the movement of said guides into a numeric control of the electroerosion cutting machine, wherein sections of upper and lower paths for the guides are generated differently from each other at the workpiece, the improvement comprising inputting of only data of starting points $(A_U, A_L)$ and end points $(B_U, B_L)$ of each respective section of the upper and lower paths into the numeric control of the machine, wherein sections of the upper and lower paths located between the respective starting points $(A_U, A_L)$ and end points $(B_U, B_L)$ are interpolated according to algorithms different from each other and selected in dependence on the path to be generated.

2. A method according to claim 1, wherein said wire electrode is moved in such manner that it simultaneously runs through starting points $(A_U, A_L)$ and end points ($B_U$,$B_L$), respectively, of the respective upper and lower paths.

3. A method according to claim 1, wherein one of interpolations is circular and another interpolation is elliptical.

4. A method according to claim 1, wherein one of interpolations is linear and another interpolation is elliptical.

5. A method according to claim 1, wherein one of interpolations is linear and another interpolation is circular.

6. A method according to claim 1, wherein one of interpolations is hyperbolic and another interpolation is linear.

7. A method according to claim 1, wherein one of interpolations is hyperbolic and another interpolation is circular.

8. A method according to claim 1, wherein one of interpolations is hyperbolic and another interpolation is elliptical.

9. A method according to claim 1, wherein one of interpolations is circular and another interpolation is parabolic.

10. A method according to claim 1, wherein one of interpolations is elliptical and another interpolation is parabolic.

11. A method according to claim 1, wherein one of interpolations is linear and another interpolation is parabolic.

12. A method according to claim 1, wherein one of interpolations is hyperbolic and another interpolation is parabolic.

13. A method according to claim 1, wherein one of interpolations is parabolic and another interpolation is cubic.

14. A method according to claim 1, wherein one of interpolations is circular and another interpolation is cubic.

15. A method according to claim 1, wherein one of interpolations is elliptical and another interpolation is cubic.

16. A method according to claim 1, wherein one of interpolations is linear and another interpolation is cubic.

17. A method according to claim 1, wherein one of interpolations is hyperbolic and another interpolation is cubic.

18. A device for performing numeric path control of a wire electrode electroerosion cutting machine including two wire guides, a workpiece located therebetween and arranged at a further guide, drives for said guides for moving a wire electrode and the workpiece relative to each other independently from each other, memories assigned to the drives and provided to store values of upper and lower paths of the guides defined at the workpiece, and interpolators assigned to the respective memories, said interpolators being independent of each other and being provided to determine values intermediate between neighboring points of a path, said memories being adapted to store only starting points ($A_U$,$A_L$) and end points ($B_U$,$B_L$) of respective upper and lower paths, and said interpolators being adapted to perform interpolations of the respective upper and lower path different from each other and in dependence on the path to be generated.

* * * * *